Figure 1:
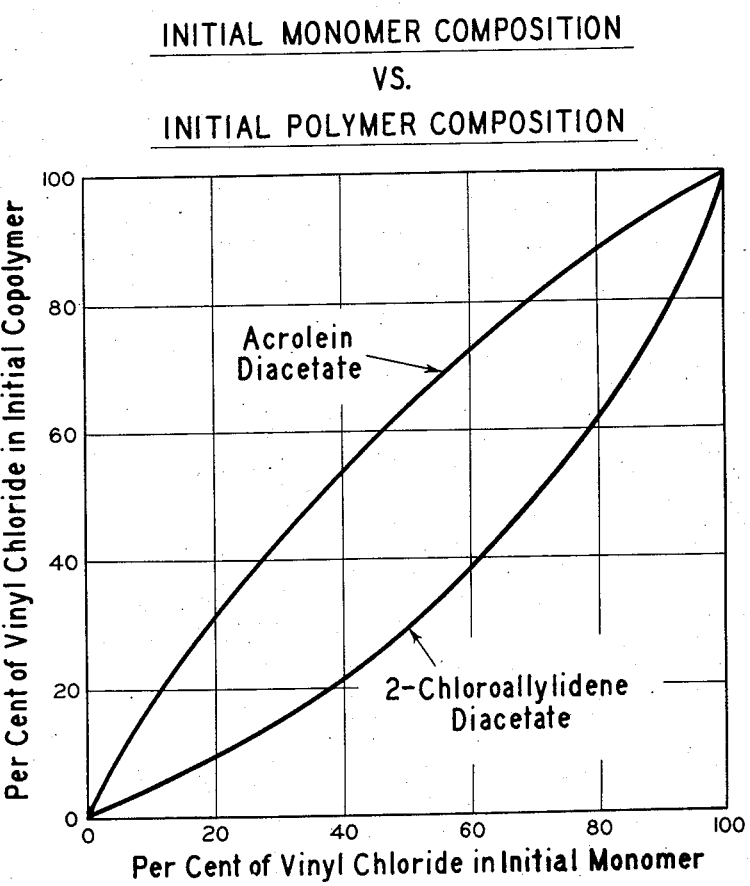
Figure 2:
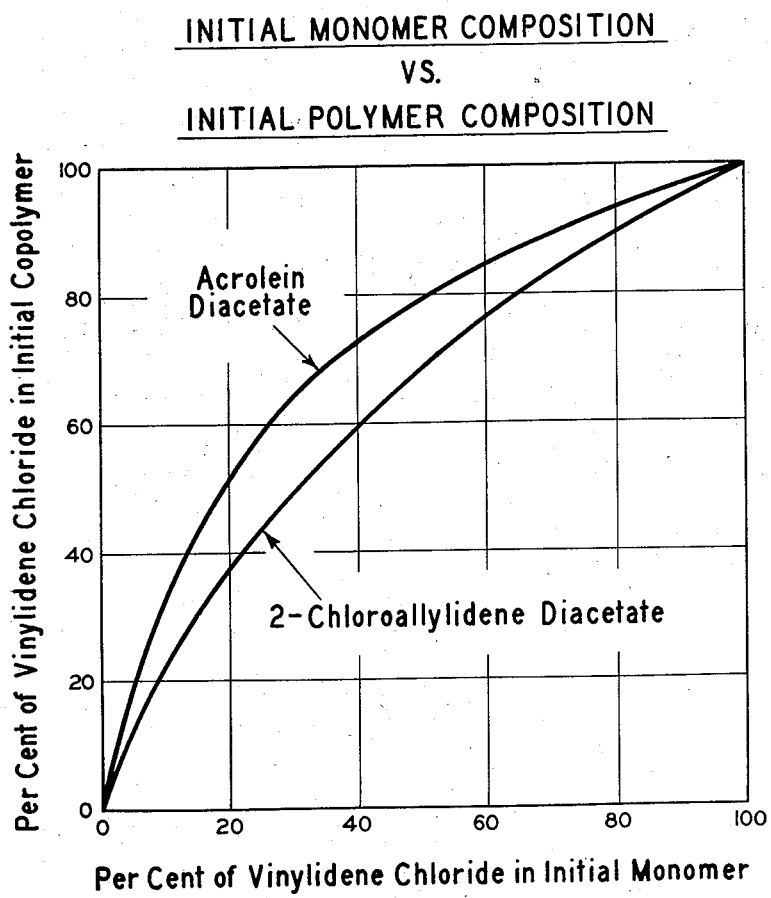
Figure 3:
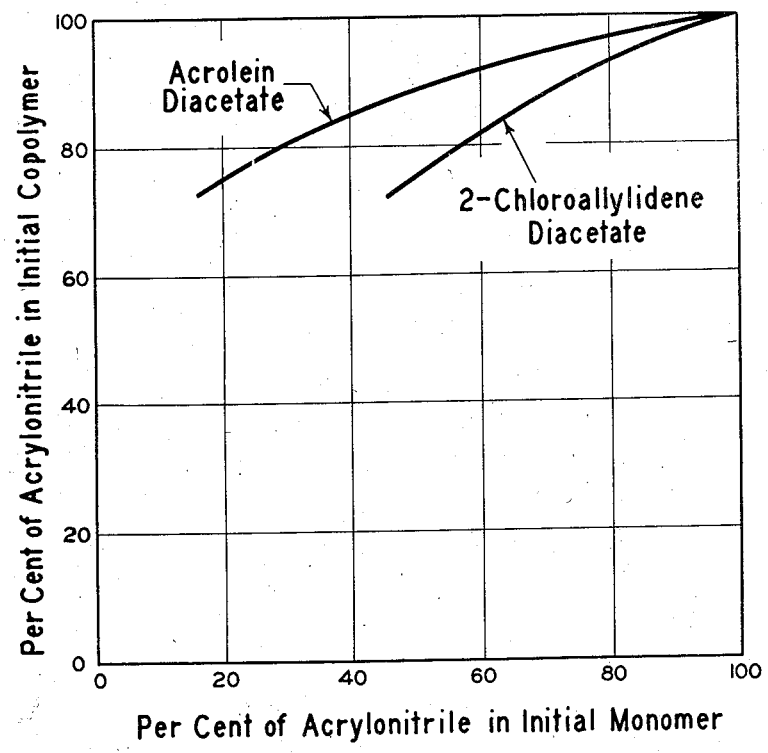

INVENTORS
BRUCE R. THOMPSON
HARRY A. STANSBURY, JR.

United States Patent Office 2,853,477
Patented Sept. 23, 1958

2,853,477

COPOLYMERS OF VINYL CHLORIDE AND 2-CHLOROALLYLIDENE DIACETATE

Bruce R. Thompson, Charleston, and Harry A. Stansbury, Jr., South Charleston, W. Va., assignors to Union Carbide Corporation, a corporation of New York Application October 20, 1955, Serial No. 541,704

5 Claims. (Cl. 260—87.1)

This invention relates to a new synthetic resin, and in particular it pertains to a new copolymer of vinyl chloride.

Resins derived from vinyl chloride by polymerization alone or with other monomers have achieved an important industrial position in the fields of elastomers, molding and extrusion materials, and surface coatings. Until recently, the homopolymers of vinyl chloride, because of their high softening temperature, were little used by themselves, but, in combination with a plasticizer, these homopolymers form strong and tough elastomeric compositions of wide utility. However, polyvinyl chloride polymers of lower molecular weight, suitable for extrusion, have now been developed, but the extrusion temperature of these plastics is still undesirably high and problems of resin stability exist.

Accordingly, there exists a need for rigid plastic materials which can be extruded or worked at lower fabrication temperatures where problems of resin stability are less severe. This need has previously been satisfied in part of copolymerizing vinyl chloride with another monomer which, as a constituent of the resulting polymer, acts as an internal plasticizer. The resulting copolymers can be worked or fabricated, as by extrusion, at lower operating temperatures. Although numerous monomers have been suggested for this purpose, only three types have enjoyed widespread commercial acceptance. These are vinyl esters, such as vinyl acetate; acrylate esters, such as ethyl acrylate; and vinylidene chloride.

However, all of these presently available rigid vinyl copolymers suffer from one or more objectionable features, such as low heat distortion point, poor heat stability, or difficulty in fabrication. Other monomers which have been suggested as internal plasticizers, have resulted in copolymers which are less deficient in one or more of these properties, but such monomers have not had practical copolymerization rates with vinyl chloride. Acrolein diacetate is an example of such a monomer. It copolymerizes with vinyl chloride at a slower rate than the vinyl chloride. This means that, when all the vinyl chloride has combined to form a copolymer, a residue of unpolymerized acrolein diacetate remains. It is impractical to recover such high-boiling, polymerizable liquids from the polymerization charge because of high separation costs.

According to this invention, it has been discovered that a copolymer of vinyl chloride with a new monomer, 2-chloroallylidene diacetate, has distinctive properties, as compared to other polymers and copolymers of vinyl chloride. In contrast to the homopolymers of vinyl chloride, the new copolymer is easier to fabricate into useful shapes and objects, as by milling, molding or extrusion. In comparison to the copolymers of vinyl chloride with vinyl acetate, for example, the new copolymers have the advantage of a higher heat distortion point, which means that molded or extruded articles of the new copolymer may be used in applications requiring high heat resistance. As compared to other monomers, such as acrolein diacetate, it has been discovered that 2-chloroallylidene diacetate copolymerizes with vinyl chloride at a faster relative rate of copolymerization than the vinyl chloride. By a faster rate of copolymerization is meant that the 2-chloroallylidene diacetate enters the resin being formed disproportionately faster than the vinyl chloride. This insures that the copolymerization reaction, if carried to reasonably high conversions of monomers to polymer, will consume substantially all the 2-chloroallylidene diacetate monomer. Thus, the problem of recovering this relatively high boiling (B. P. 212° C.) monomer from the charge can be minimized or eliminated. The excess vinyl chloride is separated readily, as it is a gas at atmospheric pressure and temperature, and can be withdrawn easily from the polymerization autoclave by releasing the pressure.

The relative rates of copolymerization with vinyl chloride of acrolein diacetate and 2-chloroallylidene diacetate are given in Figure 1. Thus, from a 50–50 mixture of each monomer with vinyl chloride; the initial copolymer with acrolein diacetate will contain about 65% vinyl chloride and 35% acrolein diacetate; whereas the initial copolymer with 2-chloroallylidene diacetate will contain about 70% 2-chloroallylidene diacetate and 30% of vinyl chloride. As the copolymerization with acrolein diacetate proceeds, the unpolymerized portion of the mixture becomes richer in acrolein diacetate until, finally, the vinyl chloride monomer is exhausted. The remainder of the acrolein diacetate must then be recovered, and this is difficult because it tends to decompose at distillation temperatures. On the other hand, as the copolymerization with 2-chloroallylidene diacetate proceeds, the unpolymerized portion of the mixture becomes richer in vinyl chloride, until ultimately, the concentration of 2-chloroallylidene diacetate is reduced to a low level. As above noted, the excess vinyl chloride remaining is easy to recover, and discard of residual amounts of the 2-chloroallylidene diacetate can be tolerated economically.

While 2-chloroallylidene diacetate has a favorable copolymerization rate with vinyl chloride; with certain other typical monomers, such as vinylidene chloride or acrylonitrile, 2-chloroallylidene diacetate resembles acrolein diacetate in that it is the slower component to copolymerize. For example, the relative rates of copolymerization of acrolein diacetate and 2-chloroallylidene diacetate with vinylidene chloride are given in Figure II, and with acrylonitrile in Figure III.

The copolymers of vinyl chloride and 2-chloroallylidene diacetate may have either a uniform or non-uniform composition depending on the method of polymerization. Non-uniform copolymers result when a given proportion of monomers are charged to an autoclave, and no additions or withdrawals of monomers are made. For example, with reference to Figure 1, the first copolymer formed from a charge containing 80% vinyl chloride will contain about 62% vinyl chloride; and the combined vinyl chloride content of the instantaneous copolymer formed will thereafter increase as the monomer charge becomes richer in vinyl chloride. A uniform copolymer can be made by charging the monomers in the proportions required to give a copolymer of the desired composition, and then maintaining this proportion by the continuous or incremental additions of 2-chloroallylidene diacetate as the polymerization proceeds. For example, to obtain a copolymer in which all the constituent macromolecules contain about 80% combined vinyl chloride, the monomers are charged initially in a 92–8 ratio of vinyl chloride to 2-chloroallylidene diacetate. Then 2-chloroallylidene diacetate monomer is added to the polymerization charge at such a rate as to maintain its concentration in the combined monomer mixture at about 8%. The additions are discontinued when about half or more of the total monomers charged have been converted to resinous materials.

Another method of making a uniform copolymer is to withdraw vinyl chloride gas from the autoclave, which is maintained at a constant temperature, at such a rate as to maintain a constant pressure, corresponding to the original concentration of the volatile vinyl chloride in the autoclave.

The copolymers of vinyl chloride with 2-chloroallylidene diacetate can be prepared by employing the various techniques for vinyl-type polymerizations. These include bulk, solution, suspension and emulsion polymerization. In bulk polymerization no diluent is used other than the unpolymerized monomers; in solution polymerization there is used an organic solvent for the monomer, and in emulsion or suspension polymerization, the monomers are emulsified or suspended in water. The latter two methods differ principally in the concentration and type of emulsifying agent; more of the agent being used in emulsion polymerization, and the resulting polymer particles being smaller in size.

A polymerization catalyst of the usual type is normally employed to accelerate the rate of polymerization. Such catalysts include organic peroxides, such as diacetyl peroxide, dibenzoyl peroxide, or bis(monochloroacetyl) peroxide; inorganic peroxides, such as hydrogen peroxide or potassium persulfate; and free radical catalysts, such as azo-bis-iso-butyronitrile. Redox recipes involving combinations of an inorganic peroxide and a reducing agent, such as a potassium persulfate-sodium bisulfite combination may be used. Other agents to regulate the resin properties may be added, such as tertiary heptadecyl mercaptans to reduce the molecular weight.

Solvents for the monomer which may be used in solution polymerization include acetone, dimethyl formamide, ethyl acetate and cyclohexanone. These materials are also, in general, solvents for the resulting copolymers.

The polymerization temperatures are normal for vinyl chloride polymerization, and they are usually in the range of 30° C. to 70° C. As vinyl chloride is a gas at these temperatures and at atmospheric pressure, sufficient pressure is employed in the autoclave to maintain the vinyl chloride in the liquid phase at the temperature selected. Higher polymerization temperatures result, in general, in resins of lower molecular weight but faster rates of polymerization, and lower polymerization temperatures result in lower reaction rates and polymers of higher molecular weights.

As shown in Figure 1, copolymers having a wide range of composition can be made by the copolymerization of vinyl chloride and 2-chloroallylidene diacetate. For many applications, the most useful resins contain from 5% to 30% by weight of copolymerized 2-chloroallylidene diacetate, and have intrinsic viscosities (a measure of molecular weight) from 0.1 to 1.2. Such resins have a favorable combination of high ASTM heat distortion points in the range 75° C. to 80° C. and are easily molded and extruded at process temperatures in the range of 110° C. to 170° C. Thus they may be used for molded and extruded articles where heat resistance is required as in the electrical industry and for forming a wide variety of plastic articles capable of withstanding higher service temperatures. Such articles include molded objects, rigid sheets, and extruded shapes, such as pipe. As compared to the known rigid vinyl chloride-vinyl acetate copolymers of comparable vinyl chloride contents, and molecular weight, the new copolymers have ASTM heat distortion points higher by about 10° C. (18° F.), and thus the new copolymers have a wider field of utility. Thus, rigid sheets of the new copolymer may be used in making electroplating and acid baths, exhaust ducts and hoods.

With respect to copolymers formed by methods giving rise to non-uniform copolymers, it will be understood that copolymer masses which contain from 5 to 30% copolymerized 2-chloroallylidene diacetate as an average composition, may also be composed in part of macromolecules which contain more than 30% and less than 5% of copolymerized 2-chloroallylidene diacetate.

The new copolymers are also soluble in the common lacquer solvents, such as methyl ethyl ketone, cyclohexanone and acetone, and films deposited from such solutions are hard and tough with good heat resistance. Plasticizers or softening agents, such as dioctyl phthalate, didecyl phthalate or tricresyl phosphate may also be incorporated in such films to increase their elasticity.

As previously pointed out, the copolymerization of vinyl chloride with 2-chloroallylidene diacetate can be carried to a conversion of total monomers to a polymer at which substantially all or an economically sufficient fraction of the 2-chloroallylidene diacetate enters the copolymer. The amount of the 2-chloroallylidene diacetate left unpolymerized depends not only on the final conversion but also on the concentration of 2-chloroallylidene diacetate in the initial monomer mixture with vinyl chloride. At concentrations of 5% to 25% by weight of the 2-chloroallylidene diacetate in the initial mixture, approximately 75% to 82% of this monomer has copolymerized at a conversion of 50%; approximately 85% to 90% has copolymerized at a conversion of 60%; and at a conversion of 80%, more than 95%, i. e. substantially all of the 2-chloroallylidene diacetate, has copolymerized.

The following examples will serve to illustrate the invention:

*Example 1.—Copolymer of 2-chloroallylidene diacetate-vinyl chloride by bulk polymerization*

To a Pyrex tube were charged:

9.0 grams vinyl chloride
1.0 gram 2-chloroallylidene diacetate
0.4 cc. of 25 percent solution of diacetyl peroxide in dimethyl phthalate The tube was purged with nitrogen, sealed, and rocked in a water bath at 40° C. for 6.5 hours. The recovered polymer amounted to 1.0 gram (10 percent conversion) and analyzed 71.8 percent polyvinyl chloride. The copolymer had a reduced viscosity $I_r$ of 0.31 in cyclohexanone.

Reduced viscosities are measured with a resin concentration of 0.2 gram per ml. of solvent at 30° C. The viscosity of this dilute solution is assumed to be directly proportional to the time of flow in the capillary viscometer. Then the reduced viscosity, $I_R$, is calculated as follows:

$$I_R = \frac{\text{Time of resin solution} - \text{time of solvent}}{\text{Time of solvent}} \times \frac{1}{\text{Resin concentration, g./100 ml.}}$$

*Example 2.—Copolymer of 2-chloroallylidene diacetate-vinyl chloride by an emulsion procedure*

To each of 2 pressure bottles were charged:

45.0 grams vinyl chloride
5.0 grams 2-chloroallylidene diacetate
150.0 grams distilled water
0.5 gram Aerosol OT[1]
0.25 gram Tergitol 4[2]
0.5 gram potassium persulfate

[1] Dioctyl sodium sulfosuccinate.
[2] Sodium sulfate of 7-ethyl-2-methylundecanol-4.

The bottles were purged with nitrogen, capped, and rotated in a water bath at 40–50° C. for 24 hours. The recovered polymer from both bottles amounted to 68.0 grams (68 percent conversion) and analyzed 86.0 percent polyvinyl chloride. At this conversion, about 93% of the 2-chloroallylidene diacetate copolymerized.

The polymer had a reduced viscosity of 0.65 in cyclohexanone and was evaluated as a rigid stock material. (See Table I.)

*Example 3.—Copolymer of 2-chloroallylidene diacetate-vinyl chloride by solvent polymerization*

To each of 2 pressure bottles were charged:

138.0 grams vinyl chloride
12.0 grams 2-chloroallylidene diacetate
93.7 cc. acetone
5.0 cc. of a 30 percent solution of diacetyl peroxide in dimethyl phthalate The bottles were purged with nitrogen, capped, and rotated in a water bath at 40° C. for 66 hours. The recovered polymer amounted to 250 grams (83.3 percent conversion) and analyzed 87.0 percent polyvinyl chloride. At this conversion, 98% of the 2-chloroallylidene diacetate copolymerized.

The polymer had a reduced viscosity of 0.59 in cyclohexanone, and was evaluated as a rigid stock material (see Table I).

*Example 4.—Copolymer of 2-chloroallylidene diacetate-vinyl chloride by solvent polymerization*

To a lead-lined, two-gallon autoclave were charged:

3220 grams vinyl chloride
280 grams 2-chloroallylidene diacetate
2350 grams acetone
35 cc. of a 30 percent solution of diacetyl peroxide in dimethyl phthalate The autoclave was purged with nitrogen. Agitation was furnished by a motor-driven shaft and propeller. The polymerization was run at 42° C. for 57.5 hours. The recovered polymer amounted to 910 grams (26 percent conversion) and analyzed 80.0 percent polyvinyl chloride. At this conversion, about 51% of the 2-chloroallylidene diacetate copolymerized. The polymer had a reduced viscosity of 0.41 and was evaluated as a rigid stock material. (See Table I.)

The copolymers resulting from the foregoing three examples were molded into test specimens, i. e. bars, discs, and the like, and their heat distortion points, molding temperature and heat stability determined. For comparison these properties were also determined on copolymers of vinyl chloride with vinyl acetate and with acrolein diacetate. The heat distortion points of the new copolymers were about 11 to 14° C. higher than the vinyl chloride-vinyl acetate copolymers and 2.5° C. to 5.5° C. higher than the vinyl chloride-acrolein diacetate copolymer. The test results follow:

TABLE I

| Type Copolymer | 2-Chloroallylidene Diacetate, Example 2 | 2-Chloroallylidene Diacetate, Example 3 | 2-Chloroallylidene Diacetate, Example 4 | Vinyl Acetate | Allylidene Diacetate |
|---|---|---|---|---|---|
| Polymerization Method | Emulsion | Solvent | Solvent | Solvent | Solvent |
| Percent Polyvinyl Chloride | 86.0 | 87.0 | 80.0 | 86.6 | 84.0 |
| Reduced Viscosity | 0.65 | 0.59 | 0.41 | 0.55 | 0.45 |
| ASTM Heat Distortion, ° C. | 77.5 | 77.3 | 80.5 | 66.5 | 75.0 |
| Apparent Molding Temp., ° C. | 210 | 202 | 172 | 164 | 162.5 |
| Heat Stability, Minutes at 135° C. | ¹ 90 | 240 | 240 | 120 | 270 |

¹ The lower heat stability of this specimen was probably due to residual emulsifying agents. The other heat stability values are very good for a chlorine-containing monomer.

*Example 5.—Copolymer of 2-chloroallylidene diacetate-vinyl chloride by bulk polymerization*

To a glass-lined five-gallon autoclave were charged:

24.5 pounds vinyl chloride
0.5 pound 2-chloroallylidene diacetate
0.15 pound of a 25 percent solution of diacetyl peroxide in dimethyl phthalate The autoclave was purged with vinyl chloride vapors before charging. Agitation was furnished by a motor-driven shaft and propeller. The polymerization was run at 35° C. for 40 hours. The recovered polymer amounted to 2.25 pounds (9.0 percent conversion) and analyzed 93.7 percent polyvinyl chloride. The copolymer had a reduced viscosity of 0.97 in cyclohexanone and was evaluated as a rigid stock material.

*Example 6.—Copolymer of 2-chloroallylidene diacetate-vinyl chloride by solvent polymerization*

To the pressure reactor of Example 5 were charged:

14.25 pounds vinyl chloride
0.75 pound 2-chloroallylidene diacetate
15.00 pounds acetone
0.30 pound of a 25 percent solution of diacetyl peroxide in dimethyl phthalate The autoclave was purged with vinyl chloride vapors before charging. Agitation was furnished by a motor-driven shaft and propeller. The polymerization was run at 45° C. to the end of the induction period (5.5 hours), then lowered to 40° C. for 29.5 hours. The recovered polymer amounted to 7.2 pounds (48 percent conversion) and analyzed 92 percent polyvinyl chloride. At this conversion, about 80% of the 2-chloroallylidene diacetate copolymerized. The copolymer had a reduced viscosity of 0.45 in cyclohexanone and was evaluated as a rigid stock material.

*Example 7.—Copolymer of 2-chloroallylidene diacetate-vinyl chloride by bulk polymerization*

To the pressure reactor of Example 5 were charged:

23.5 pounds vinyl chloride
1.9 pounds 2-chloroallylidene diacetate
0.15 pound of a 25 percent solution of diacetyl peroxide in dimethyl phthalate The autoclave was flushed with vinyl chloride vapors before charging. Agitation was furnished by a motor-driven shaft and propeller. The polymerization was run at 45° C. for 24 hours. The recovered polymer amounted to 4.06 pounds (16 percent conversion) and analyzed 81 percent polyvinyl chloride. The copolymer had a reduced viscosity of 0.47 in cyclohexanone and was evaluated as a rigid stock material.

The copolymers from the foregoing three examples were evaluated as rigid molding materials for such properties as color, heat distortion point, and molding temperature. For comparison, these values were also determined on a copolymer of vinyl chloride with 2-bromoallylidene diacetate and on polyvinyl chloride. The copolymers with 2-chloroallylidene diacetate were found to be much superior to the 2-bromoallylidene diacetate copolymers from the standpoint of color, and also had significantly higher heat-distortion points; the heat distortion avlues for the bromine-containing copolymers being no better than and inferior to the known vinyl chloride-vinyl acetate copolymers. As compared to polyvinyl chloride, the vinyl chloride-2-chloroallylidene diacetate have lower molding temperatures at no appreciable sacrifice in color or heat distortion point. The test values are given in Table II, to follow:

TABLE II

| Type Copolymer | 2-Chloroallylidene Diacetate, Example 5 | 2-Chloroallylidene Diacetate, Example 6 | 2-Chloroallylidene Diacetate, Example 7 | 2-Bromoallylidene Diacetate | 2-Bromoallylidene Diacetate | Polyvinyl Chloride |
|---|---|---|---|---|---|---|
| Percent Polyvinyl chloride | 93.7 | 92.0 | 81.0 | 81.0 | 81.3 | 100 |
| Reduced viscosity | 0.97 | 0.45 | 0.47 | 0.55 | 0.53 | 0.94 |
| Color after milling, percent BLR [1] | 60 | 80 | 69 | 19 | 27 | 68 |
| ASTM Heat Distortion point, °C | 76 | 74 | 73 | 67 | 56 | 77 |
| Flow Temp.[2] at 1,500 p. s. i., °C | 166 | 133 | 111 | 139 | 132 | 164 |

[1] Percent blue light reflected from a specimen after milling. Values below 30 extremely dark colored.
[2] Temperature at which specimen extrudes or molds under applied pressure.

What is claimed is:

1. Process for making a thermoplastic resin which comprises mixing vinyl chloride and 2-chloroallylidene diacetate to form a monomer mixture containing from 5% to 25% by weight of the 2-chloroallylidene diacetate, and heating this mixture in the present of a polymerization catalyst until at least 75% of the 2-chloroallylidene diacetate has copolymerized with the vinyl chloride.

2. Process for making a thermoplastic resin which comprises mixing vinyl chloride and 2-chloroallylidene diacetate to form a monomer mixture containing from 5% to 10% by weight of the 2-chloroallylidene diacetate, and heating this mixture in the presence of a polymerization catalsyt until at least 80% of the 2-chloroallylidene diacetate has copolymerized with the vinyl chloride.

3. Process for making a thermoplastic resin which comprises mixing vinyl chloride and 2-chloroallylidene diacetate to form a monomer mixture containing from 5% to 25% by weight of the 2-chloroallylidene diacetate, and heating this mixture at a temperature between about 30° C. and about 70° C. in the presence of a peroxide polymerization catalyst until at least 75% of the 2-chloroallylidene diacetate has copolymerized with the vinyl chloride.

4. A copolymer of vinyl chloride and 2-chlorallylidene diacetate containing from about 5% to about 30% of copolymerized 2-chloroallylidene diacetate.

5. A heat and pressure formed plastic article substantially composed of a thermoplastic resin comprising a copolymer of vinyl chloride and 2-chloroallylidene diacetate, containing from about 5% to about 30% of copolymerized 2-chloroallylidene diacetate.

References Cited in the file of this patent

UNITED STATES PATENTS 2,485,238    Izard _____ Oct. 18, 1949